(12) United States Patent
Ling et al.

(10) Patent No.: US 11,978,219 B2
(45) Date of Patent: May 7, 2024

(54) METHOD AND DEVICE FOR DETERMINING MOTION INFORMATION OF IMAGE FEATURE POINT, AND TASK PERFORMING METHOD AND DEVICE

(71) Applicant: TENCENT TECHNOLOGY (SHENZHEN) COMPANY LIMITED, Shenzhen (CN)

(72) Inventors: Yonggen Ling, Shenzhen (CN); Shenghao Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 422 days.

(21) Appl. No.: 17/323,740

(22) Filed: May 18, 2021

(65) Prior Publication Data

US 2021/0272294 A1 Sep. 2, 2021

Related U.S. Application Data

(63) Continuation of application No. PCT/CN2020/085000, filed on Apr. 16, 2020.

(30) Foreign Application Priority Data

Apr. 29, 2019 (CN) .......................... 201910356752.4

(51) Int. Cl.
*G06T 7/246* (2017.01)
(52) U.S. Cl.
CPC .... *G06T 7/246* (2017.01); *G06T 2207/10016* (2013.01)
(58) Field of Classification Search
CPC ...................................................... G06T 7/246
See application file for complete search history.

(56) References Cited

U.S. PATENT DOCUMENTS 10,445,862 B1 * 10/2019 Merry ..................... G06T 7/254
11,044,404 B1 * 6/2021 Persiantsev .......... G01B 11/245
(Continued)

FOREIGN PATENT DOCUMENTS

| CN | 102378002 A | 3/2012 |
|----|-------------|--------|
| CN | 104700415 A | 6/2015 |

(Continued)

OTHER PUBLICATIONS

The European Patent Office (EPO) The partial supplementary European Search Report for 20798875.9 dated Jun. 7, 2022 24 pages.

(Continued)

*Primary Examiner* — Oneal R Mistry
(74) *Attorney, Agent, or Firm* — ANOVA LAW GROUP, PLLC

(57) ABSTRACT

A method for determining motion information is provided to be executed by a computing device. The method includes: determining a first image and a second image, the first image and the second image each including an object; determining a first pixel region based on a target feature point on the object in the first image; determining a second pixel region according to a pixel difference among a plurality of first pixel points in the first pixel region and further according to the target feature point; and obtaining motion information of the target feature point according to the plurality of second pixel points and the second image, the motion information being used for indicating changes in locations of the target feature point in the first image and the second image.

20 Claims, 8 Drawing Sheets

(56) References Cited

U.S. PATENT DOCUMENTS

| | | | |
|---|---|---|---|
| 2007/0183667 | A1 | 8/2007 | Wyatt et al. |
| 2011/0043706 | A1 | 2/2011 | Van Beek et al. |
| 2013/0029730 | A1 | 1/2013 | Harada et al. |
| 2015/0029230 | A1 | 1/2015 | Akagunduz |
| 2015/0243038 | A1* | 8/2015 | Zhao ............... G06V 40/25 382/103 |
| 2018/0205926 | A1 | 7/2018 | Mogalapalli et al. |
| 2019/0026905 | A1 | 1/2019 | Siegemund et al. |
| 2019/0251931 | A1* | 8/2019 | Oh ...................... G06T 7/20 |
| 2020/0012858 | A1 | 1/2020 | Xiang |
| 2021/0049347 | A1 | 2/2021 | Zhao et al. |

FOREIGN PATENT DOCUMENTS

| | | |
|---|---|---|
| CN | 109344742 A | 2/2019 |
| CN | 110097576 A | 8/2019 |
| JP | H11218499 A | 8/1999 |
| JP | 2008276731 A | 11/2008 |
| JP | 2013025717 A | 2/2013 |
| WO | 2015004501 A1 | 1/2015 |
| WO | 2019042426 A1 | 3/2019 |

OTHER PUBLICATIONS

The Japan Patent Office (JPO) Notification of Reasons for Refusal for Application No. 2021-529019 dated Jul. 11, 2022 8 pages (including translation).

Yui-Lam Chan et al., "A block motion vector estimation using pattern based pixel decimation," 1997 IEEE International Symposium on Circuits and Systems (ISCAS), Jun. 9-12, 1997, Hong Kong, IEEE, 1997, pp. 1153-1156. 4 pages.

Yankang Wang et al, "A Novel Adaptive Pixel Decimation for Block Motion Vector Estimation," IEICE Transactions on Communication, IEICE, Jan. 25, 1999, vol. E82-B, No. 1, pp. 188-191. 4 pages.

The World Intellectual Property Organization (WIPO) International Search Report for PCT/CN2020/085000 dated Jul. 21, 2020 6 Pages (including translation).

B. D. Lucas et al., "An iterative image registration technique with an application to stereo vision," In Proc. of the Intl. Joint Conf. on Artificial Intelligence, 1981. 10 pages.

J. Shi et al., "Good features to track," In Proc. of IEEE Conf. on Computer Vision and Pattern Recognition, 1994. 8 pages.

S. Baker et al., "Lucas-Kanade 20 years on: A unifying framework," International Journal of Computer Vision, 56(3):221-255, 2004. 35 pages.

* cited by examiner

METHOD AND DEVICE FOR DETERMINING MOTION INFORMATION OF IMAGE FEATURE POINT, AND TASK PERFORMING METHOD AND DEVICE

RELATED APPLICATION(S)

This application is a continuation application of PCT Patent Application No. PCT/CN2020/085000, filed on Apr. 16, 2020, which claims priority to Chinese Patent Application No. 201910356752.4, entitled "METHOD AND DEVICE FOR DETERMINING MOTION INFORMATION OF AN IMAGE FEATURE POINT, AND TASK PERFORMING METHOD AND DEVICE" filed with the National Intellectual Property Administration, PRC on Apr. 29, 2019, all of which are incorporated herein by reference in entirety.

FIELD OF THE TECHNOLOGY

The present disclosure relates to the field of Internet technologies, and in particular, to a method and device for determining motion information of an image feature point, and a task performing method and device.

BACKGROUND

With the development of Internet technologies, feature point tracking technologies have been used in certain scenarios such as mobile robots or virtual reality. The feature point tracking technology is a process of analyzing a situation of changes in locations of the same feature point in a plurality of consecutive frames of images. In this field, motion information is usually used for describing a process of changes in locations of a feature point in different images.

In certain situations, and by way of example where motion information of a feature point from a current frame of image in a video to a next frame of image is determined, a process of determining the motion information of the image feature point may include obtaining by a computer device a pixel region in the current frame of image, in which the feature point is located. To make a result accurate, a relatively large region is usually selected as the pixel region. The computer device determines the motion information of the image feature point based on a plurality of pixel points in a plurality of pixel regions and a plurality of pixel points in a plurality of corresponding pixel regions in a next frame of image. However, in these instances, because the selected pixel region is relatively large, a relatively large quantity of pixel points may need to be calculated. As a result, the efficiency of the process of determining the motion information of the image feature point may not be very desirable.

SUMMARY

According to various embodiments of the present disclosure, a method, apparatus, computing device, and storage medium for determining motion information are provided, and a task performing method, apparatus, target device, and storage medium are further provided.

In one aspect, the present disclosure provides a method for determining motion information to be performed by a computing device. The method including: determining a first image and a second image, the first image and the second image including the same object; determining, based on a target feature point on the object in the first image, a first pixel region including the target feature point in the first image; determining a second pixel region including the target feature point in the first image according to a pixel difference among a plurality of first pixel points in the first pixel region and further according to the target feature point, a pixel difference among a plurality of second pixel points in the second pixel region being greater than the pixel difference among the plurality of first pixel points, the plurality of second pixel points and the plurality of first pixel points having the same quantity, and the pixel difference being used for indicating a change extent of pixel values of a plurality of pixel points; and obtaining motion information of the target feature point according to the plurality of second pixel points and the second image, the motion information being used for indicating changes in locations of the target feature point in the first image and the second image.

In another aspect, the present disclosure provides a computing device. The computing device includes a memory storing computer program instructions; and a processor coupled to the memory and configured to execute the computer program instructions and perform: determining a first image and a second image, the first image and the second image each including an object; determining, based on a target feature point on the object in the first image, a first pixel region including the target feature point in the first image; determining a second pixel region including the target feature point in the first image according to a pixel difference among a plurality of first pixel points in the first pixel region and further according to the target feature point, a pixel difference among a plurality of second pixel points in the second pixel region being greater than the pixel difference among the plurality of first pixel points, the plurality of second pixel points and the plurality of first pixel points being same in quantity, and the pixel difference being used for indicating a change extent of pixel values of a plurality of pixel points; and obtaining motion information of the target feature point according to the plurality of second pixel points and the second image, the motion information being used for indicating changes in locations of the target feature point in the first image and the second image.

In yet another aspect, the present disclosure provides a non-transitory computer-readable storage medium storing computer program instructions executable by at least one processor to perform: determining a first image and a second image, the first image and the second image each including an object; determining, based on a target feature point on the object in the first image, a first pixel region including the target feature point in the first image; determining a second pixel region including the target feature point in the first image according to a pixel difference among a plurality of first pixel points in the first pixel region and further according to the target feature point, a pixel difference among a plurality of second pixel points in the second pixel region being greater than the pixel difference among the plurality of first pixel points, the plurality of second pixel points and the plurality of first pixel points being same in quantity, and the pixel difference being used for indicating a change extent of pixel values of a plurality of pixel points; and obtaining motion information of the target feature point according to the plurality of second pixel points and the second image, the motion information being used for indicating changes in locations of the target feature point in the first image and the second image.

In yet another aspect, the present disclosure provides a task performing method, performed by a target device, the method including: obtaining a first image and a second image, the first image and the second image including the same object; obtaining motion information of a target feature point on the object in the first image, the motion information being used for indicating changes in locations of the target feature point in the first image and the second image; and performing a target task based on the motion information of the target feature point.

In yet another aspect, the present disclosure provides an apparatus for determining motion information. The apparatus includes: a determining module, configured to determine a first image and a second image, the first image and the second image including the same object; the determining module being further configured to determine, based on a target feature point on the object in the first image, a first pixel region including the target feature point in the first image; and the determining module being further configured to determine a second pixel region including the target feature point in the first image according to a pixel difference among a plurality of first pixel points in the first pixel region and further according to the target feature point, a pixel difference among a plurality of second pixel points in the second pixel region being greater than the pixel difference among the plurality of first pixel points, the plurality of second pixel points and the plurality of first pixel points having the same quantity, and the pixel difference being used for indicating a change extent of pixel values of a plurality of pixel points; and an obtaining module, configured to obtain motion information of the target feature point according to the plurality of second pixel points and the second image, the motion information being used for indicating changes in locations of the target feature point in the first image and the second image.

In some embodiments, the determining module is further configured to obtain, when or in response to determining the pixel difference among the plurality of first pixel points in the first pixel region is less than a target difference value, the second pixel region that is greater than the first pixel region and that includes the target feature point according to the target feature point.

In some embodiments, the determining module is further configured to obtain, when or in response to determining the pixel difference among the plurality of first pixel points in the first pixel region is less than a target difference value, the second pixel region in the same size as that of the first pixel region according to the target feature point, where the first pixel region and the second pixel region include different pixel points.

In some embodiments, the determining module is further configured to expand the first pixel region into the second pixel region including the target feature point according to a target expansion coefficient by centering on the target feature point.

In some embodiments, the determining module is further configured to move the first pixel region to the second pixel region including the target feature point according to the target feature point and a target movement track.

In some embodiments, the determining module is further configured to: obtain a third pixel region including the target feature point according to the target feature point when or in response to determining the pixel difference among the plurality of first pixel points is less than a target difference value, where a plurality of third pixel points in the third pixel region and the plurality of first pixel points have the same quantity; determine a pixel difference among the plurality of third pixel points according to pixel values of the plurality of third pixel points in the third pixel region; and determine the third pixel region as the second pixel region when or in response to determining the pixel difference among the plurality of third pixel points is not less than the target difference value.

In some embodiments, the determining module is further configured to increase a first sampling stride of the first pixel region to a second sampling stride according to an expansion coefficient from the first pixel region to the third pixel region, and obtain, from the third pixel region according to the second sampling stride, the third pixel points having the same quantity as that of the plurality of first pixel points.

In some embodiments, the determining module is further configured to obtain, from the third pixel region according to a first sampling stride of the first pixel region, the third pixel points having the same quantity as that of the plurality of first pixel points.

In some embodiments, the apparatus further includes: a detection module, configured to detect, when or in response to determining the pixel difference among the plurality of third pixel points is less than the target difference value, whether a size of the third pixel region is greater than a target threshold, where the determining module is further configured to determine a fourth pixel region greater than the third pixel region when or in response to determining the size of the third pixel region is not greater than the target threshold; and the determining module is further configured to determine the second pixel region including the target feature point in the first image based on a pixel difference among a plurality of fourth pixel points in the fourth pixel region and the target feature point, where the plurality of fourth pixel points and the plurality of first pixel points have the same quantity.

In some embodiments, the pixel difference is a pixel variance of the plurality of pixel points or a minimum feature value of a gradient matrix of the plurality of pixel points, the pixel variance is used for representing a change extent of pixel values of the plurality of pixel points relative to a pixel average value, and the gradient matrix is used for representing a change extent of the pixel values of the plurality of pixel points relative to the pixel average value on a horizontal gradient and a change extent of the pixel values of the plurality of pixel points relative to the pixel average value on a vertical gradient respectively.

In some embodiments, the first pixel region and the second pixel region are in any shape of a square, a rectangle, a circle, a ring shape, an irregular polygon, or an irregular curved shape.

In some embodiments, the determining module is further configured to: obtain the plurality of first pixel points from a plurality of pixel points on a region boundary of the first pixel region according to a first sampling stride of the first pixel region; and determine the pixel difference among the plurality of first pixel points according to the pixel values of the plurality of first pixel points.

In yet another aspect, the present disclosure provides a task performing apparatus. The task performing apparatus including: an obtaining module, configured to obtain a first image and a second image, the first image and the second image including the same object; and the obtaining module being further configured to obtain motion information of a target feature point on the object in the first image, the motion information being used for indicating changes in locations of the target feature point in the first image and the second image; and a task processing module, configured to perform a target task based on the motion information of the target feature point.

In some embodiments, the target task includes a path planning task, and the task processing module is further configured to: determine, when or in response to determining there are a plurality of target feature points and based on motion information of the plurality of target feature points, at least one scene object whose distance to the target device does not exceed a first threshold, where the target device is a device capturing the first image and the second image; and determine, according to a location of a destination whose distance to the target device does not exceed a second threshold and the at least one scene object, a first target path through which the target device reaches the destination, where the second threshold is greater than the first threshold.

In some embodiments, the target task includes an object recognition task, and the task processing module is further configured to: determine, when or in response to determining there are a plurality of target feature points and based on motion information of the plurality of target feature points, a plurality of first feature points, of the plurality of target feature points, whose motion information meets a target condition, where the plurality of first feature points are used for indicating a moving object of a plurality of objects included in the first image and the second image; and determine an object category of the moving object based on locations of the plurality of first feature points in the first image or the second image.

Other aspects of the present disclosure can be understood by those skilled in the art in light of the description, the claims, and the drawings of the present disclosure.

Details of one or more embodiments of the present disclosure are provided in the accompanying drawings and descriptions below. Other features, objectives, and advantages of the present disclosure become apparent from the present disclosure, the drawings, and the claims.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In one or more embodiments of the present disclosure, the term "based on" is employed herein interchangeably with the term "according to."

Figure 1:
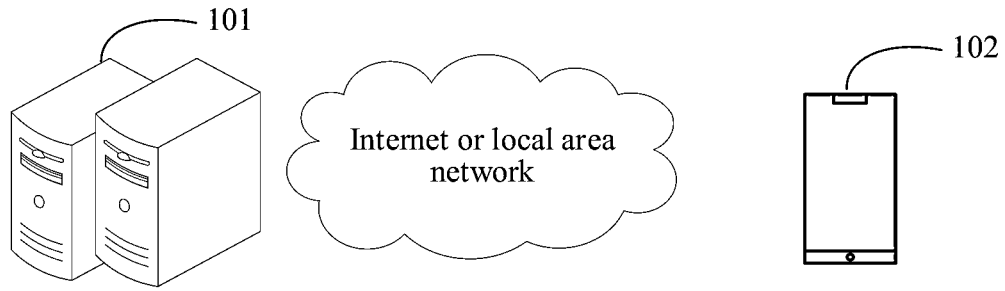
FIG. 1 is a schematic diagram of an implementation environment of a method for determining motion information of an image feature point according to one or more embodiments of the present disclosure.

FIG. 1 is a schematic diagram of an implementation environment of a method for determining motion information of an image feature point according to an embodiment of the present disclosure. Referring to FIG. 1, the implementation environment includes: a computing device 101. The computing device 101 may obtain two or more frames of images having the same object. The computing device 101 may determine motion information of a target feature point on the object from a frame of image to another frame of image, so as to track a situation of changes in locations of the target feature point in different images, and a feature point refers to a pixel point with a notable pixel feature in an image.

The term "computing device" may alternatively be termed "computer device" and may be a desktop and handheld computer.

In a possible scenario, the computing device 101 may obtain two or more consecutive frames of images in a video, for example, a first image and a second image, and the computing device 101 may obtain motion information of a target feature point from the first image to the second image, where the motion information is used for indicating changes in locations of the target feature point in the first image and the second image. For example, the computing device 101 may perform location tracking based on a pixel region of a feature point in an image. The pixel region of the feature point includes a target feature point, namely, a pixel point. The computing device may determine a first pixel region of the target feature point in the first image; determine, based on a pixel difference among a plurality of first pixel points in the first pixel region, a second pixel region with a larger pixel difference in the first image, where the second pixel region and the first pixel region have the same quantity of pixel points; and may therefore determine, based on a plurality of second pixel points in the second pixel region and the second image, motion information of the target feature point from the first image to the second image.

In a possible implementation scenario, the implementation environment may further include: a computing device 102, and the computing device 102 may capture more than one frame of image, and transmit the more than one frame of image to the computing device 101.

The computing device 101 may be provided as any device such as a server or a terminal or any device such as an intelligent robot, an unmanned vehicle, an unmanned aerial vehicle, or an unmanned ship. The computing device 102 may be provided as a mobile phone, a camera, a terminal, a monitoring device, or the like, and actual forms of the computing device 101 and the computing device 102 are not specifically limited in the embodiments of the present disclosure.

Figure 2:
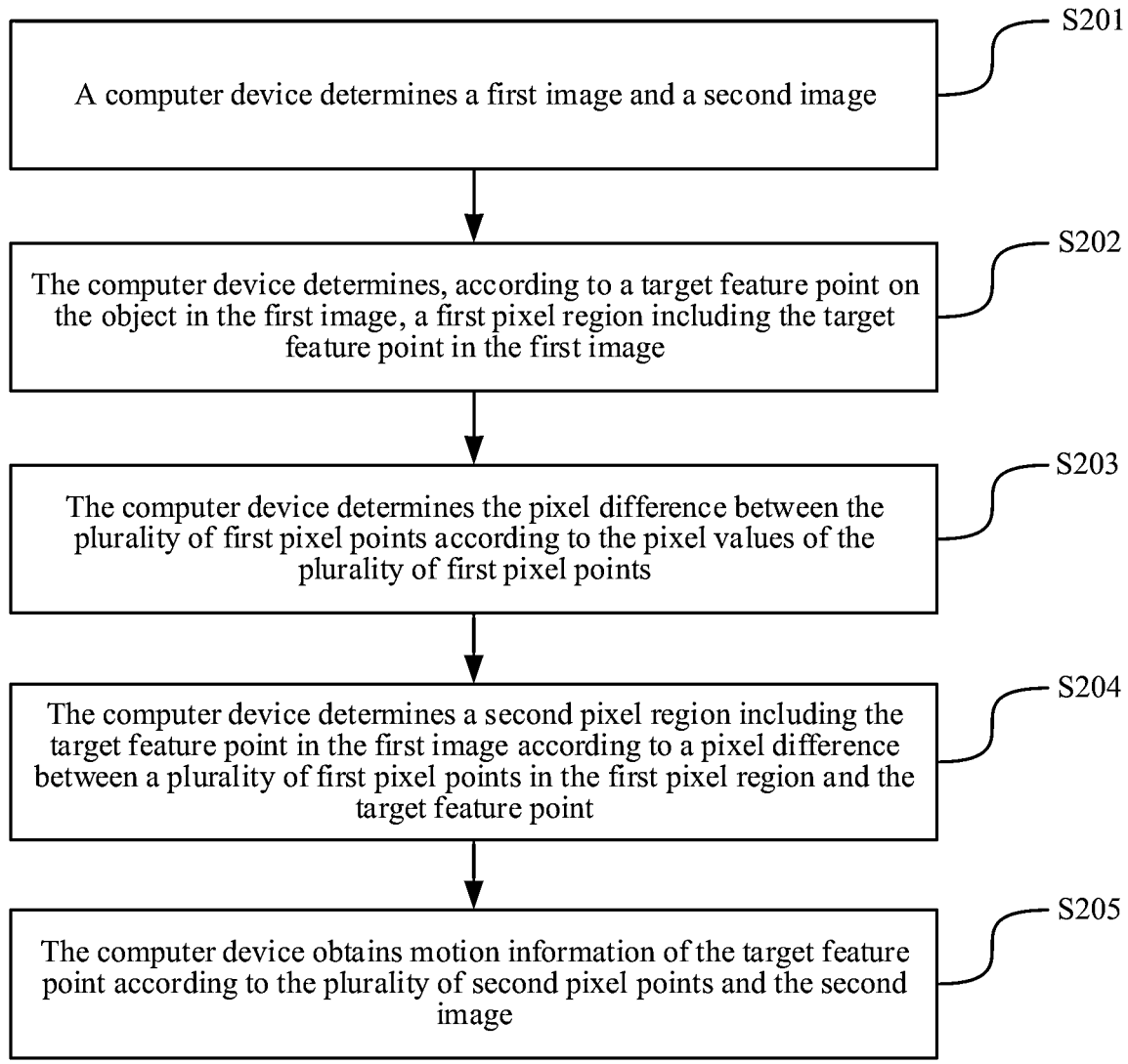
FIG. 2 is a flowchart of a method for determining motion information of an image feature point according to one or more embodiments of the present disclosure.

FIG. 2 is a flowchart of a method for determining motion information of an image feature point according to an embodiment of the present disclosure. This embodiment of the present disclosure is performed by a computing device. Referring to FIG. 2, the method includes the following steps:

S201. The computing device determines a first image and a second image.

The first image and the second image include the same object, and the object may be any object in an actual display form, for example, a house, a road sign, or a vehicle. In a possible scenario, the first image and the second image may be two frames of images in a video that include the same object, and a time stamp of the second image may follow that of the first image.

In some embodiments, the computing device may photograph a surrounding environment in real time, to obtain a video, and the computing device may determine a first image in the video and a second image whose time stamp follows that of the first image. In a possible implementation scenario, the computing device may be any movable device such as an unmanned vehicle, an intelligent robot, or an unmanned aerial vehicle. The computing device may be alternatively a movable device on which a camera is installed, and then the computing device may further record a video in a movement process. In another possible implementation scenario, the computing device may obtain the first image and the second image from a target device. For example, the target device may capture the first image and the second image that include the same object in a movement process, the computing device receives a video transmitted by the target device, and obtains the first image and the second image in the video, and the target device may be a monitoring device, a mobile phone, a camera, or the like.

In some embodiments, the computing device may further determine a target feature point on the object in the first image. The computing device may extract the target feature point on the object in the first image through a target algorithm, and the target algorithm may be a scale-invariant feature transform (SIFT) algorithm, a speeded up robust features (SURF) algorithm, or the like.

The target feature point refers to a pixel point with a notable pixel feature in the image, for example, a point whose pixel value has a difference from pixel values of a plurality of surrounding pixel points that is greater than a target pixel difference. Based on different image resolution magnitudes, quantities of sampling pixel points in the same image are also different. A sampling pixel point refers to a pixel point for sampling an image based on a target resolution. The target feature point may be a sampling pixel point in the first image, or may be a pixel point between two sampling pixel points in the first image. In some embodiments, the computing device may represent a location of a sampling pixel point in the first image by using integer coordinates, and the integer coordinates mean that values of the coordinates are both integers. Then, when the target feature point is a sampling pixel point in the first image, coordinates of the target feature point may be integer coordinates, and when the target feature point is a pixel point between two sampling pixel points, coordinates of the target feature point may alternatively be non-integer coordinates.

S202. The computing device determines, according to a target feature point on the object in the first image, a first pixel region including the target feature point in the first image.

The computing device may determine, according to a location of the target feature point, the first pixel region that includes the target feature point and that is in a target shape in the first image. The target shape of the first pixel region may be any shape of a square, a rectangle, a circle, a ring shape, or an irregular polygon or curved shape. In some embodiments, the shape of the first pixel region may be a centrally symmetrical shape, and then the computing device determines the first pixel region in the target shape by centering on the target feature point.

In some embodiments, the first pixel region is a region including at least a first target quantity of pixel points. The computing device may further take, according to the first target quantity and the target shape and by centering on the target feature point, a region that is in the target shape and that includes pixel points in a quantity not less than the first target quantity as the first pixel region. In some embodiments, when or in response to determining the target shape is a square, the computing device determines, according to the first target quantity, a square region that centers on the target feature point and whose side length is a first side length as the first pixel region; and the square of the first side length is not less than the first target quantity. For example, if the target quantity is 9, the first side length may be an integer of 3 or more than 3. For example, the side length is 5 or 9. If the target shape is a circle, the computing device determines, according to the target quantity, a circular region that centers on the target feature point and whose radius is a target radius as the first pixel region; and when or in response to determining the target shape is a rectangle, a rhombus, a circular ring shape, or any other shape, the computing device determines the first pixel region by using the same principle, and details are not described herein again.

The pixel points in the first pixel region reflect surrounding pixel features of the target feature point, and the computing device may alternatively select some pixel points in the first pixel region, to represent surrounding pixel features of the target feature point. In some embodiments, the computing device may further determine a plurality of first pixel points in the first pixel region in a sampling manner, and the plurality of first pixel points reflect a situation of changes in surrounding pixel features of the target feature point. The computing device determines a first sampling stride according to a total quantity of pixel points in the first pixel region and a second target quantity, and obtains one first pixel point from pixel points in each first sampling stride of a plurality of pixel points in the first pixel region according to the first sampling stride, to obtain the second target quantity of first pixel points. When or in response to determining the first target quantity and the second target quantity are the same, the first sampling stride is 1. In some embodiments, the target quantity of first pixel points may be evenly distributed on a boundary of the first pixel region by centering on the target feature point, and then the computing device divides a total pixel point quantity of pixel points in the first pixel region that are located on the region boundary by the target quantity, and takes an obtained quotient value as the first sampling stride. The computing device obtains, according to the first sampling stride, the second target quantity of first pixel points from a plurality of pixel points located on the boundary of the first pixel region.

The foregoing is about obtaining the first pixel points through screening in an even sampling manner, and the computing device may alternatively obtain the first pixel points through screening in an uneven sampling manner. In a possible example, the computing device may alternatively screen the first pixel points according to distances of a plurality of pixel points in the first pixel region to the target feature point. The computing device obtains a plurality of distances among the plurality of pixel points and the target feature point, and divides the plurality of pixel points into a plurality of pixel point sets according to the plurality of distance, and a distance between a pixel point in each pixel point set and the target feature point falls within a distance range corresponding to the pixel point set. For example, a distance range corresponding to a set A is 1.0 to 4.9, and a distance range corresponding to a set B is 5.0 to 9.9. For each pixel point set, the computing device determines, according to a distance between the each pixel point set and the target feature point, a first sampling stride corresponding to the pixel point set, and obtains a plurality of first pixel points of a plurality of pixel points in the pixel point set according to the first sampling stride corresponding to the pixel point set, thereby obtaining the second target quantity of first pixel points. In a possible example, a distance between a pixel point set and a target feature point may be an average value of a plurality of distances between a plurality of pixel points in the pixel point set and the target feature point. For example, the computing device may perform screening in a manner of being dense in the center and sparse at edges. That is, a larger distance between the pixel point set and the target feature point indicates a smaller first sampling stride corresponding to the pixel point set, and a smaller distance between the pixel point set and the target feature point indicates a larger first sampling stride corresponding to the pixel point set. The computing device may perform screening in a manner of being sparse in the center and dense at edges, and then a correspondence between a distance between the pixel point set and the target feature point, and the first sampling stride is just opposite to that in the manner of being dense in the center and sparse at edges, and details are not described herein again. In another example, the computing device may alternatively obtain the second target quantity of first pixel points from the first pixel region through screening in a random sampling manner.

That "a plurality of", "a plurality of" types of and "a plurality of" times of mentioned in the embodiments of the present disclosure specifically refer to "more than one", "more than one type of", and "more than one time of".

Figure 3:
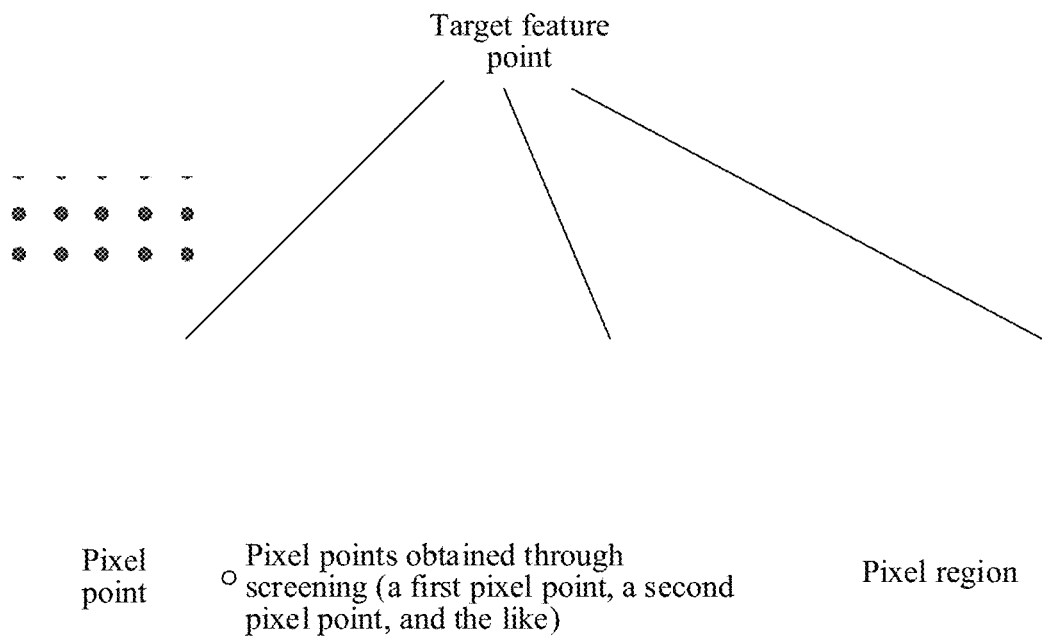
FIG. 3 is a schematic diagram of a pixel region according to one or more embodiments of the present disclosure.

As shown in FIG. 3, a square pixel region is used as an example for description. A black point is a pixel point, and a white point is a pixel point obtained through screening. For the square pixel region, the computing device obtains pixel points from a plurality of pixel points on the boundary of the square region through screening. When or in response to determining the quantity of the pixel points on the boundary of the pixel region is equal to the second target quantity, the first sampling stride may be 1, and when or in response to determining the quantity of the pixel points on the boundary of the pixel region is greater than the second target quantity, the sampling stride may be greater than 1. For example, the second target quantity may be 9. As shown in (a) in FIG. 3, a pixel region is a square region including 3×3 pixel points, and the sampling stride may be 1 pixel point. As shown in (b) in FIG. 3, a pixel region may be a square region including 5×5 pixel points, and the sampling stride may be 2 pixel points. As shown in (c) in FIG. 3, a pixel region may be a 9×9 square region, and the sampling stride may be 4 pixel points.

S203. The computing device determines the pixel difference among the plurality of first pixel points according to the pixel values of the plurality of first pixel points.

The pixel difference is used for indicating a change extent of pixel values of a plurality of pixel points. In some embodiments, a pixel difference among a plurality of pixel points may be a pixel variance of the plurality of pixel points or a minimum feature value of a gradient matrix of the plurality of pixel points, the pixel variance of the plurality of pixel points is used for representing a change extent of pixel values of the plurality of pixel points relative to a pixel average value, and the gradient matrix of the plurality of pixel points is used for representing a change extent of the pixel values of the plurality of pixel points relative to the pixel average value on a horizontal gradient and a change extent of the pixel values of the plurality of pixel points relative to the pixel average value on a vertical gradient respectively. Then, the computing device may represent the pixel difference among the plurality of first pixel points by using the pixel variance of the plurality of first pixel points or the minimum feature value of the gradient matrix of the plurality of first pixel points.

In some embodiments, the computing device determines an average value of pixel values of a plurality of first pixel points, and determines a pixel difference among the plurality of first pixel points according to a difference between a pixel value of each of the first pixel points and the average value. In a possible example, if a pixel variance is used for representing a pixel difference, the computing device may determine a pixel variance of the plurality of first pixel points through the following formula 1 according to the average value of the pixel values of the plurality of first pixel points and a pixel value of each first pixel point:

$$\text{var} = \sum_u \frac{(I_u - M)^2}{N},$$

where N is the quantity of the plurality of first pixel points, N may be the second target quantity, for example, N=l×l, l is 3, and M is the average value of the pixel values of the plurality of first pixel points, for example, $$M = \frac{1}{N}\sum_u I_u;$$

$I_u$ is the pixel values of the plurality of first pixel points, and var represents a pixel variance of the plurality of first pixel points; and u represents the plurality of first pixel points.

In some embodiments, the computing device may alternatively represent the pixel difference by using the gradient matrix of the plurality of first pixel points. Then, the computing device may determine the horizontal gradient of the pixel values and the vertical gradient of the pixel values of the plurality of first pixel points according to the pixel values of the plurality of first pixel points, obtain the minimum feature value of the gradient matrix of the plurality of first pixel points according to the horizontal gradient of the pixel values and the vertical gradient of the pixel values, and determine the minimum feature value as the pixel difference among the plurality of first pixel points.

In a possible example, the gradient matrix may be a covariance matrix whose variables are the vertical gradient and the horizontal gradient of the pixel values of the plurality of pixel points. Then, the computing device may determine the minimum feature value of the gradient matrix of the plurality of first pixel points through the following formula 2 according to the horizontal gradient of the pixel values and the vertical gradient of the pixel values of the plurality of first pixel points:

$$S = \begin{bmatrix} \sum_{u} g_x(u) g_x(u) & \sum_{u} g_x(u) g_y(u) \\ \sum_{u} g_x(u) g_y(u) & \sum_{u} g_y(u) g_y(u) \end{bmatrix},$$

where $g_x(u)$ is the horizontal gradient of the pixel values of the plurality of first pixel points u, $g_y(u)$ is the vertical gradient of the pixel values of the plurality of first pixel points u, and u represents the plurality of first pixel points; and the matrix S represents the gradient matrix of the plurality of first pixel points. The computing device may determine the minimum feature value of the matrix S, and obtain the pixel difference among the plurality of first pixel points.

When or in response to determining the target feature point is a pixel point between two sampling pixel points, coordinates of the target feature point may be non-integer coordinates, and therefore coordinates of the first pixel point may also be non-integer coordinates. The computing device may determine a pixel value of the first pixel point according to pixel values of surrounding pixel points of the first pixel point. In a possible example, the computing device may determine pixel values of pixel points in non-integer locations by using a bidirectional linear interpolation algorithm. The computing device obtains pixel values of surrounding pixel points of the first pixel point, and determines a pixel value of the first pixel point according to the following formula 3:

$$I = i0*(u-u3)*(v-v3)+i1*(u-u2)*(v-v2)+i2*(u-u1)*(v-v1)+i3*(u-u0)*(v-v0). \quad \text{formula 3:}$$

Figure 4:
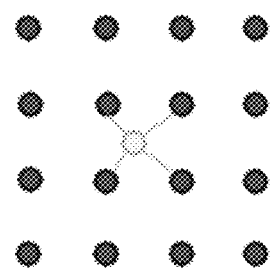
FIG. 4 is a schematic diagram of a pixel point location according to one or more embodiments of the present disclosure.

As shown in FIG. 4, I represents the pixel value of the first pixel point; i0 represents a pixel value of a pixel point in an upper left corner of the first pixel point, and a location representation is (u0, v0); i1 represents a pixel value of a pixel point in an upper right corner of the first pixel point, and a location representation is (u1, v1); i2 represents a pixel value of a pixel point in a lower left corner of the first pixel point, and a location representation is (u2, v2); i3 represents a pixel value of a pixel point in a lower right corner of the first pixel point, and a location representation is (u3, v3); and (u, v) represents a location of the first pixel point.

S204. The computing device determines a second pixel region including the target feature point in the first image according to a pixel difference among a plurality of first pixel points in the first pixel region and the target feature point.

A pixel difference among a plurality of second pixel points in the second pixel region is greater than the pixel difference among the plurality of first pixel points, and the plurality of second pixel points and the plurality of first pixel points have the same quantity. The computing device obtains a target difference value. When or in response to determining the pixel difference among the plurality of first pixel points is less than the target difference value, the computing device adjusts the first pixel region, to obtain the second pixel region whose pixel difference is greater than the target difference value. In this embodiment of the present disclosure, the computing device may obtain the second pixel region with a larger pixel difference by expanding the first pixel region, or obtain the second pixel region by moving the first pixel region. Correspondingly, this step may be implemented in the following two manners.

A first manner is as follows: The computing device obtains, when or in response to determining the pixel difference among the plurality of first pixel points is less than a target difference value, the second pixel region that is greater than the first pixel region and that includes the target feature point according to the target feature point.

In this embodiment of the present disclosure, the computing device may expand the first pixel region according to a specific expansion rule or randomly expand the first pixel region. In some embodiments, the shape of the first pixel region may be a centrally symmetrical shape, and the computing device expands the first pixel region into the second pixel region including the target feature point according to a target expansion coefficient by centering on the target feature point. For example, the first pixel region may be a 3×3 square having a side length of l=3, and the computing device expands the 3×3 square into a 5×5 square according to an expansion coefficient of (2l−1).

In this embodiment of the present disclosure, the computing device may adjust the first pixel region a plurality of times, so as to obtain the second pixel region whose pixel difference is greater than the target difference value. The process may be as follows: The computing device may obtain a third pixel region including the target feature point according to the target feature point when or in response to determining the pixel difference among the plurality of first pixel points is less than a target difference value, where a plurality of third pixel points in the third pixel region and the plurality of first pixel points have the same quantity; the computing device determines a pixel difference among the plurality of third pixel points according to pixel values of the plurality of third pixel points in the third pixel region; and the computing device determines the third pixel region as the second pixel region when or in response to determining the pixel difference among the plurality of third pixel points is not less than the target difference value. In a possible implementation, the computing device may expand the first pixel region into the third pixel region including the target feature point according to a target expansion coefficient by centering on the target feature point. Similar to the foregoing manner of obtaining the plurality of first pixel points, the computing device may also obtain the plurality of third pixel points from the third pixel region according to a specific sampling stride. In a possible implementation, the process of obtaining, by the computing device, the plurality of third pixel points in the third pixel region may include: increasing, by the computing device, a first sampling stride of the first pixel region to a second sampling stride according to an expansion coefficient from the first pixel region to the third pixel region, and obtaining, from the third pixel region according to the second sampling stride, the third pixel points having the same quantity as that of the plurality of first pixel points. For example, for a 3×3 square, the computing device captures one first pixel point every two pixel points, and then for a 5×5 square, the computing device captures one third pixel point every three pixel points.

If the pixel difference among the plurality of third pixel points in the third pixel region is less than the target difference value, the computing device continues to expand the third pixel region, until the second pixel region whose pixel difference is not less than the target difference value is obtained. The process in which the computing device obtains the pixel difference among the plurality of third pixel points is similar to the foregoing process of obtaining the pixel difference among the plurality of first pixel points, and details are not described herein again.

In some embodiments, the computing device may alternatively determine, based on the size of the pixel region, whether to continue to expand the third pixel region. The process may include: detecting, by the computing device when or in response to determining the pixel difference among the plurality of third pixel points is less than the target difference value, whether a size of the third pixel region is greater than a target threshold; determining, by the computing device, a fourth pixel region greater than the third pixel region when or in response to determining the size of the third pixel region is not greater than the target threshold; and determining, by the computing device, the second pixel region including the target feature point in the first image based on a pixel difference among a plurality of fourth pixel points in the fourth pixel region and the target feature point, where the plurality of fourth pixel points and the plurality of first pixel points have the same quantity.

The computing device obtains the pixel difference among the plurality of third pixel points according to a pixel value of each third pixel point. In some embodiments, the computing device obtains an average value of the pixel values of the plurality of third pixel points according to the pixel values of the plurality of third pixel points, and the computing device obtains a pixel variance of the plurality of third pixel points according to the average value, and determines the pixel variance as the pixel difference among the plurality of third pixel points. In some embodiments, the computing device obtains the horizontal gradient of the pixel values and the vertical gradient of the pixel values of the plurality of third pixel points according to the pixel values of the plurality of third pixel points, and the computing device obtains a minimum feature value of the gradient matrix of the plurality of third pixel points according to the horizontal gradient of the pixel values and the vertical gradient of the pixel values of the plurality of third pixel points, and determines the minimum feature value as the pixel difference among the plurality of third pixel points.

The process is similar to the foregoing process of processing the first pixel point, and details are not described herein again. Both the target difference value and the target threshold may be set as required, and this is not specifically limited in the embodiments of the present disclosure. For example, the target threshold may be 13×13, that is, a maximum pixel region of the target feature point may be a region including 13×13 pixel points.

A second manner is as follows: The computing device obtains, when or in response to determining the pixel difference among the plurality of first pixel points is less than a target difference value, the second pixel region in the same size as that of the first pixel region according to the target feature point.

In some embodiments, the computing device may store a target movement track in advance, and the target movement track is used for indicating a movement process of the first pixel region. Then, this step may include: moving, by the computing device, the first pixel region to the second pixel region including the target feature point according to the target feature point and a target movement track. For example, the target movement track may be moved to the right by one unit, and then in the second pixel region obtained after the 3×3 square centering on the target feature point is moved, the target feature point is in a left midpoint location in the square.

In this embodiment of the present disclosure, the computing device may move the first pixel region a plurality of times, so as to obtain the second pixel region whose pixel difference is greater than the target difference value. That is, the computing device may obtain the third pixel region in the second manner, and obtain the second pixel region based on the pixel difference among the plurality of third pixel points in the third pixel region. The process is similar to the foregoing process in the first manner, and specific details are not described herein again. A difference is as follows: Because the first pixel region is not expanded in the second manner, the computing device does not need to increase the first sampling stride to obtain the third pixel points, and the computing device may directly obtain, from the third pixel region according to a first sampling stride of the first pixel region, the third pixel points having the same quantity as that of the plurality of first pixel points.

Regardless of how a pixel region is changed, the computing device obtains the same quantity of first pixel points or second pixel points, so that it is ensured that a quantity of pixel points actually participating in calculation is unchanged when the pixel difference is increased; and determining is performed based on a difference between pixel points in the pixel region and the target difference value, and a difference between pixel points in the second pixel region obtained by continuously and tentatively increasing or moving the first pixel region is relatively large, thereby ensuring that pixel feature changes in the pixel region are notable, to avoid a problem of inaccurately determining motion information caused because pixel luminance changes in some pixel regions that are smooth or whose texture is not rich are not notable. Moreover, because the pixel difference of the pixel region becomes larger when the pixel region is continuously increased or moved, using a region whose pixel difference is relatively large to represent a pixel change feature of a surrounding region of the target feature point not only ensures that a pixel difference among pixel points participating in calculation is relatively large, but also ensures that a quantity of the pixel points participating in calculation is unchanged and the calculation amount is not increased, thereby balancing the quantity of pixel points participating in calculation and the pixel difference among the pixel points. Therefore, when or in response to determining calculation complexity of tracking the target feature point is unchanged, a pixel richness extent of the pixel region is increased, thereby improving robustness of tracking the target feature point, and the tracking can be stably performed in an environment that is smooth or lacking in texture, thereby improving generalization of scenarios to which the tracking is applicable.

S205. The computing device obtains motion information of the target feature point according to the plurality of second pixel points and the second image.

The motion information being used for indicating changes in locations of the target feature point in the first image and the second image. The computing device may determine a start pixel point in a corresponding location in the second image according to the first location of the target feature point in the first image, obtain a plurality of fourth pixel points in a pixel region with the start pixel point, and determine motion information of the target feature point according to the plurality of fourth pixel points and the plurality of second pixel points and based on a Gauss-Newton algorithm. The computing device may further obtain a location of the target feature point in the second image. The plurality of fourth pixel points and the plurality of second pixel points have the same quantity.

In some embodiments, the motion information may include movement distances of the target feature point respectively on an x axis and a y axis of an image coordinate axis. The computing device determines motion information of the target feature point from the first image to the second image according to pixel values of the target quantity of second pixel points and pixel values of the plurality of fourth pixel points and based on the following formula 4:

$$\min_{d^i_{t+1}} \sum_{u \in T^i_t} \| I_{t+1}(u + d^i_{t+1}) - I_t(u) \|^2_2,$$

where $T^i_t$ represents the plurality of second pixel points in the second pixel region with the target feature point i, and of $d^i_{t+1}$ represents motion information of the target feature point i; $d^i_{t+1}=(u_x, u_y)$ represents two-dimensional movement distances on the x axis and the y axis respectively; and u represents the second pixel point, $I_t$ represents pixel values of the plurality of second pixel points in the first image, and $I_{t+1}$ represents pixel values of the plurality of fourth pixel points in the second image; assuming that the pixel values of the plurality of second pixel points in the first image are the same as those in the second image, the computing device may minimize pixel differences among the pixel values of the plurality of second pixel points in the first image and the pixel values of the plurality of fourth pixel points in the second image to solve $d^i_{t+1}$.

In some embodiments, the motion information may be represented by using a homography matrix, and then the computing device determines motion information of the target feature point from the first image to the second image according to pixel values of the target quantity of second pixel points and pixel values of the plurality of fourth pixel points and based on the following formula 5:

$$\min_{H^i_{t+1}} \sum_{u \in T^i_t} \| I_{t+1}(H^i_{t+1}u) - I_t(u) \|^2_2.$$

where $T^i_t$ represents the plurality of second pixel points in the second pixel region with the target feature point i, and $H^i_{t+1}$ represents motion information of the target feature point i. In some embodiments, the computing device may represent the motion information as: H=

$$\begin{bmatrix} h_{11} & h_{12} & h_{13} \\ h_{21} & h_{22} & h_{23} \\ h_{31} & h_{32} & 1 \end{bmatrix} \in R^{3 \times 3},$$

where $h_{11}$ and $h_{22}$ respectively represent scaling coefficients of the second pixel region from the first image to the second image in an x-axis direction and a y-axis direction of an image coordinate system, and the x-axis direction and the y-axis direction may be a horizontal direction and a vertical direction in the image respectively; $h_{11}$ and $h_{22}$ together with $h_{12}$ and $h_{21}$ indicate a process of rotation along the x axis and a normal vector of the second pixel region; and $h_{12}$ and $h_{21}$ respectively represent projections of the second pixel region from the first image to the second image in the x-axis direction and the y-axis direction of the image coordinate system, $h_{13}$ and $h_{23}$ respectively represent movement distances of the second pixel region from the first image to the second image in the x-axis direction and the y-axis direction of the image coordinate system, and $h_{31}$ and $h_{32}$ respectively represent shearing parameters of the second pixel region in the x-axis direction and the y-axis direction of the image coordinate system. In some embodiments, the shearing parameters may be deformation ratios of the second pixel region in the x-axis direction and the y-axis direction. For example, the first pixel region corresponding to the feature point in the first image may be a square, the second pixel region corresponding to the feature point in the second image may be trapezoid, and if directions of upper and lower sides of the square and the trapezoid are both the x-axis direction, $h_{31}$ represents a change rate of side lengths of the upper side and the lower side of the trapezoid, and $h_{32}$ represents a change rate of side lengths of a left side and a right side of the trapezoid. U represents the second pixel point, $I_t$ represents pixel values of the plurality of second pixel points in the first image, and $I_{t+1}$ represents pixel values of the plurality of fourth pixel points in the second image; assuming that the pixel values of the plurality of second pixel points in the first image are the same as those in the second image, the computing device may minimize pixel differences among the pixel values of the plurality of second pixel points in the first image and the pixel values of the plurality of fourth pixel points in the second image to solve $H^i_{t+1}$.

Figure 5:
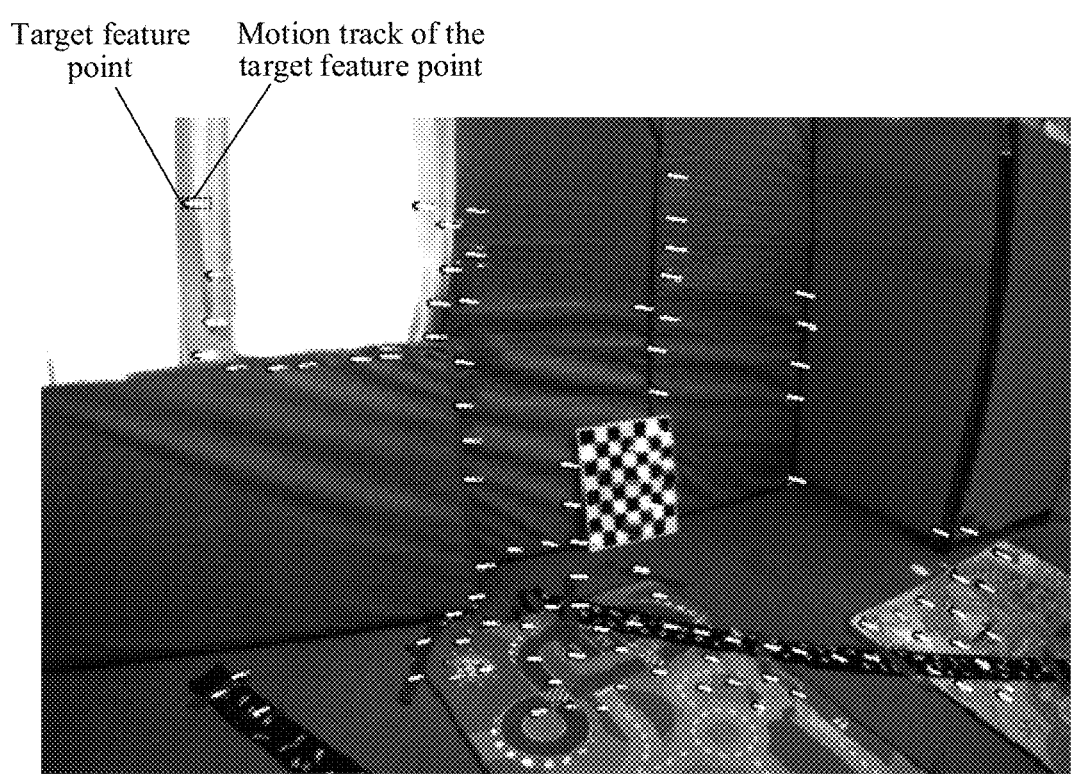
FIG. 5 is a schematic diagram of motion information of a pixel point according to one or more embodiments of the present disclosure.

Target feature points in the embodiments of the present disclosure are distributed sparsely in an image, and therefore may alternatively become sparse target feature points. The first image and the second image may be two frames of consecutive images in a video captured by a camera. A video stream captured by the camera in real time provides observation performed by the camera on an external environment at different moments. Motion information of a target feature point is often used for processes such as motion detection, motion estimation, real-time positioning, three-dimensional reconstruction, and object segmentation. For example, FIG. 5 shows a process of tracking a target feature point. A motion track of the target feature point, that is, from a location on an image in which the target feature point is detected for the first time to a current location of the target feature point on the image, is represented by using a white line following each target feature point.

Figure 6:
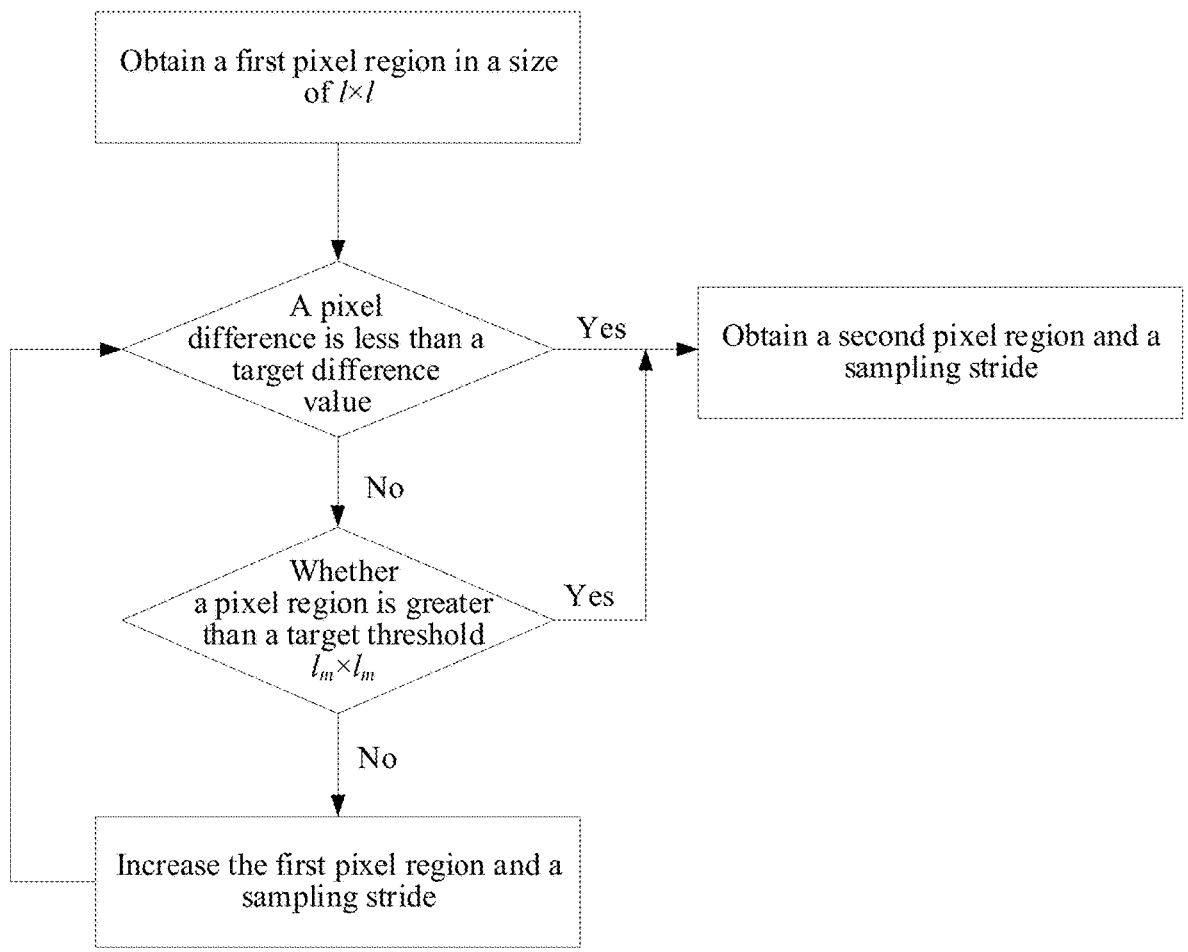
FIG. 6 is a schematic flowchart of determining motion information of an image feature point according to one or more embodiments of the present disclosure.

The foregoing steps S201 to S205 are described below by using a flowchart shown in FIG. 6. As shown in FIG. 6, the computing device may obtain a first pixel region whose size is l×l, determine, when or in response to determining a pixel difference among pixel points in the first pixel region is less than a target difference value, whether a size of the first pixel region is greater than a target threshold $l_m \times l_m$, continue, if being not greater than $l_m \times l_m$, to increase the first pixel region, increase a sampling stride based on a third pixel region obtained after the increase, so as to obtain a plurality of third pixel points in the third pixel region through screening, and does not increase the third pixel region when or in response to determining a pixel difference among the plurality of pixel points is not less than the target difference value or a size of the third pixel region is greater than $l_m \times l_m$, where the third pixel region is used as a second pixel region; or continues, if the pixel difference among the pixel points in the third pixel region is less than the target difference value and the size of the third pixel region is not greater than $l_m \times l_m$, to increase the third pixel region, until a second pixel region whose pixel difference is not less than the target difference value or is greater than $l_m \times l_m$ is obtained.

In this embodiment of the present disclosure, the second pixel region whose pixel difference is greater than that of the first pixel region and that has the same quantity of pixel points as that of the first pixel region is obtaining based on the first pixel region including the target feature point, so that calculation may be performed based on the plurality of second pixel points in the original pixel point quantity, so as to obtain the motion information of the target feature point. Because the pixel difference among the pixel points participating in calculation is increased without changing the quantity of pixel points, the calculation complexity and the information richness extent are balanced, and efficiency of determining the motion information of the target feature point is improved while ensuring accuracy of the motion information of the target feature point.

Figure 7:
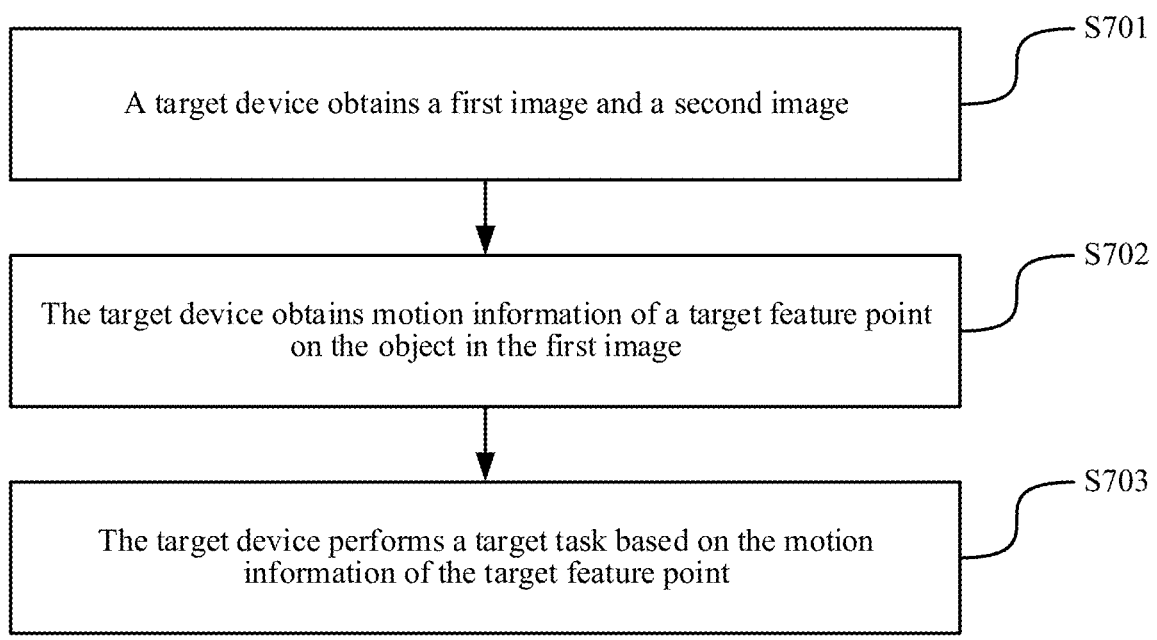
FIG. 7 is a flowchart of a task performing method according to one or more embodiments of the present disclosure.

FIG. 7 is a schematic flowchart of a task performing method according to an embodiment of the present disclosure. The method is applicable to a target device. Referring to FIG. 7, the method includes the following steps:

S701. the target device obtains a first image and a second image.

The first image and the second image include the same object, and the target device is a device capturing the first image and the second image. The target device may capture the first image and the second image that include the same object in a movement process. In some embodiments, the target device may be a computing device, and the computing device is configured to determine motion information of a target feature point in the first image, the motion information being used for indicating changes in locations of the target feature point in the first image and the second image. For example, the computing device may be a mobile phone, and then the computing device may move, and simultaneously capture an image in real time in the movement process. In some embodiments, the target device may not be the computing device. For example, the target device captures the first image and the second image in a movement process, and transmit the first image and the second image captured in real time to the computing device.

S702. The target device obtains motion information of a target feature point on the object in the first image.

In this embodiment of the present disclosure, the motion information being used for indicating changes in locations of the target feature point in the first image and the second image. If the target device is the computing device, the target device may obtain the motion information of the target feature point based on the foregoing process of steps S201 to S205 in the embodiments of the present disclosure. If the target device is not the computing device, the computing device may obtain the motion information of the target feature point based on the foregoing process of steps S201 to S205 in the embodiments of the present disclosure, and transmit the motion information of the target feature point to the target device in real time. The target device receives the motion information of the target feature point transmitted by the computing device.

S703. The target device performs a target task based on the motion information of the target feature point.

The target task may be a path planning task or an object recognition task.

In some embodiments, the target task may be a path planning task, and the target device may construct a scene object in a surrounding environment of the target device based on the motion information of the target feature point, and plan a path based on the scene object. The process may include: determining, by the target device when or in response to determining there are a plurality of target feature points and based on motion information of the plurality of target feature points, at least one scene object whose distance to the target device does not exceed a first threshold; and determining, by the target device according to a location of a destination whose distance to the target device does not exceed a second threshold and the at least one scene object, a first target path through which the target device reaches the destination, where the second threshold is greater than the first threshold.

In a specific example, the computing device may obtain a current location through positioning, and guide a user to a closest restaurant, shop, toilet, or the like based on the current location. For example, if the user is located at a floor of a large shopping mall, the target device may perform precise positioning based on a name of a surrounding shop to obtain a location of the target device at the floor. For example, if the user is located in front of a clothes shop A, the target device may guide the user to a watch shop B.

The target task may be a path planning task. In some embodiments, the target device may further perform some operations on a surrounding scene object of the target device. For example, the target device may be a robot, and the target device may place a water cup on a table. Then, after the target device determines at least one scene object whose distance to the target device does not exceed the first threshold, the target device may determine a second target path of the target device according to the at least one scene object and a to-be-performed target task, where the target task refers to a target operation to be performed on a target scene object of the at least one scene object.

In a specific example, using an example in which the target device is a virtual reality (VR) device or an augmented reality (AR) device, the VR device and the AR device may place a virtual article in a real environment based on a scene object in a scene.

In some embodiments, the target task includes an object recognition task, and the target device may recognize a moving object and a motionless object in a surrounding environment based on the first image and the second image, and may further recognize an object category of the moving object, for example, whether the moving object is a person or a vehicle. The process may include: determining, by the target device when or in response to determining there are a plurality of target feature points and based on motion information of the plurality of target feature points, a plurality of first feature points, of the plurality of target feature points, whose motion information meets a target condition, where the plurality of first feature points are used for indicating a moving object of a plurality of objects included in the first image and the second image; and determining, by the target device, an object category of the moving object based on locations of the plurality of first feature points in the first image or the second image. The object category may include: a vehicle, a person, an animal, or the like. The target condition may include that motion information of a plurality of feature points is different from motion information of other feature points or different from motion information of feature points, whose quantity exceeds a target quantity, of the plurality of feature point, for example, different from motion information of feature points of 80% of 200 feature points.

In some embodiments, after the target device recognizes a category of a moving object in a surrounding environment, the target device may further determine a third target path based on a surrounding walking person, a travelling vehicle, or a motionless house, and the third target path may be a path of avoiding the moving object, to avoid an obstacle in a movement process, thereby more accurately performing path planning.

In a specific example, if a selected target feature point is in an object, the computing device may determine whether the object moves, and determine, if moves, a direction in which the object moves, and may further obtain the object through segmentation after detecting the moving object, and determine whether the object is a person or another animal, because an animal is often in front and a scene is often behind. With the information, a mobile phone, a robot, a self-driving vehicle, or the like has a basic object recognition function.

In a specific example, the computing device may determine, based on changes in locations of all target feature points in an entire image, whether a target device moves, and may further determine, if the target device moves, a movement direction, a movement track, and the like of the target device, and further back calculate a surrounding scene object, for example, a surrounding seat or obstacle; and reconstruct a scene of the target device based on the surrounding scene object, where the scene includes a plurality of surrounding scene objects of the target device. For example, using an example in which the target device is a robot, when the robot performs a task, because the scene is reconstructed, the robot may avoid the obstacle; and in another example, the robot may further plan a next path based on a current location, to reach a place that the robot intends to reach, and perform a corresponding task.

In some embodiments, after the target device determines at least one scene object whose distance to the target device does not exceed the first threshold, the target device may further integrate the scene object and a virtual object according to the at least one scene object, to present a virtual and real integration environment to the user. The process may include: obtaining, by the target device, at least one virtual scene object, constructing, by the target device, a virtual scene according to a location of the at least one virtual scene object and a location of the at least one scene object, and displaying the virtual scene on a screen of the target device. In a specific example, because the current location is known, a real environment and a virtual environment may be rendered through a corresponding location relationship, and displayed on a screen of the computing device.

In this embodiment of the present disclosure, the target device may perform the target task by using the motion information of the target feature point on the object in the first image, for example, path planning, motion detection, or recognition of an object category of an object, and the process of determining the motion information of the target feature point is accurate and efficient, thereby improving accuracy and efficiency of performing the target task.

Figure 8:
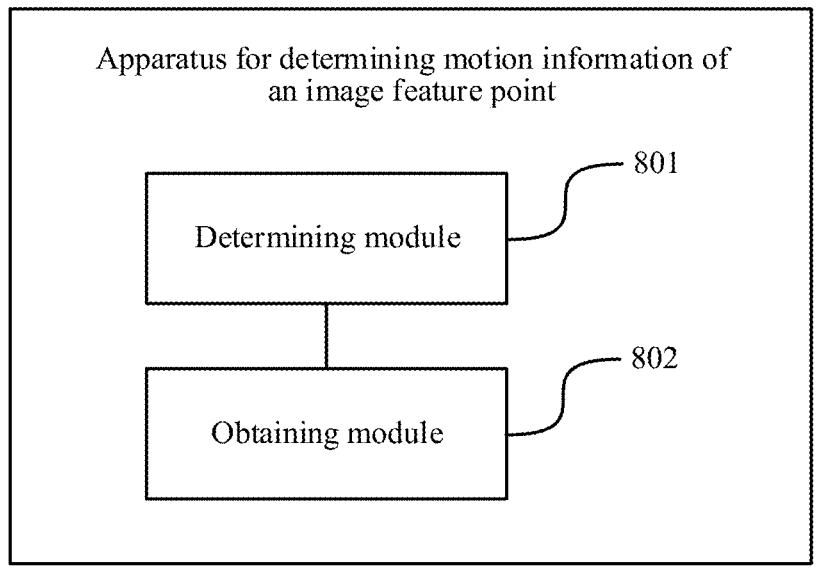
FIG. 8 is a schematic structural diagram of an apparatus for determining motion information of an image feature point according to one or more embodiments of the present disclosure.

FIG. 8 is a schematic structural diagram of an apparatus for determining motion information of an image feature point according to an embodiment of the present disclosure. Referring to FIG. 8, the apparatus includes: a determining module 801, configured to determine a first image and a second image, the first image and the second image including the same object; the determining module 801 being further configured to determine, based on a target feature point on the object in the first image, a first pixel region including the target feature point in the first image; and the determining module 801 being further configured to determine a second pixel region including the target feature point in the first image according to a pixel difference among a plurality of first pixel points in the first pixel region and the target feature point, a pixel difference among a plurality of second pixel points in the second pixel region being greater than the pixel difference among the plurality of first pixel points, the plurality of second pixel points and the plurality of first pixel points having the same quantity, and the pixel difference being used for indicating a change extent of pixel values of a plurality of pixel points; and an obtaining module 802, configured to obtain motion information of the target feature point according to the plurality of second pixel points and the second image, the motion information being used for indicating changes in locations of the target feature point in the first image and the second image.

In some embodiments, the determining module 801 is configured to obtain, when or in response to determining the pixel difference among the plurality of first pixel points in the first pixel region is less than a target difference value, the second pixel region that is greater than the first pixel region and that includes the target feature point according to the target feature point.

In some embodiments, the determining module 801 is configured to obtain, when or in response to determining the pixel difference among the plurality of first pixel points in the first pixel region is less than a target difference value, the second pixel region in the same size as that of the first pixel region according to the target feature point, where the first pixel region and the second pixel region include different pixel points.

In some embodiments, the determining module 801 is further configured to expand the first pixel region into the second pixel region including the target feature point according to a target expansion coefficient by centering on the target feature point.

In some embodiments, the determining module 801 is further configured to move the first pixel region to the second pixel region including the target feature point according to the target feature point and a target movement track.

In some embodiments, the determining module 801 is further configured to: obtain a third pixel region including the target feature point according to the target feature point when or in response to determining the pixel difference among the plurality of first pixel points is less than a target difference value, where a plurality of third pixel points in the third pixel region and the plurality of first pixel points have the same quantity; determine a pixel difference among the plurality of third pixel points according to pixel values of the plurality of third pixel points in the third pixel region; and determine the third pixel region as the second pixel region when or in response to determining the pixel difference among the plurality of third pixel points is not less than the target difference value.

In some embodiments, the determining module 801 is further configured to increase a first sampling stride of the first pixel region to a second sampling stride according to an expansion coefficient from the first pixel region to the third pixel region, and obtain, from the third pixel region according to the second sampling stride, the third pixel points having the same quantity as that of the plurality of first pixel points.

In some embodiments, the determining module 801 is further configured to obtain, from the third pixel region according to a first sampling stride of the first pixel region, the third pixel points having the same quantity as that of the plurality of first pixel points.

In some embodiments, the apparatus further includes: a detection module, configured to detect, when or in response to determining the pixel difference among the plurality of third pixel points is less than the target difference value, whether a size of the third pixel region is greater than a target threshold, where the determining module 801 is further configured to determine a fourth pixel region greater than the third pixel region when or in response to determining the size of the third pixel region is not greater than the target threshold; and the determining module 801 is further configured to determine the second pixel region including the target feature point in the first image based on a pixel difference among a plurality of fourth pixel points in the fourth pixel region and the target feature point, where the plurality of fourth pixel points and the plurality of first pixel points have the same quantity.

In some embodiments, the pixel difference is a pixel variance of the plurality of pixel points or a minimum feature value of a gradient matrix of the plurality of pixel points, the pixel variance is used for representing a change extent of pixel values of the plurality of pixel points relative to a pixel average value, and the gradient matrix is used for representing a change extent of the pixel values of the plurality of pixel points relative to the pixel average value on a horizontal gradient and a change extent of the pixel values of the plurality of pixel points relative to the pixel average value on a vertical gradient respectively.

In some embodiments, the first pixel region and the second pixel region are in any shape of a square, a rectangle, a circle, a ring shape, an irregular polygon, or an irregular curved shape.

In some embodiments, the determining module 801 is further configured to: obtain the plurality of first pixel points from a plurality of pixel points on a region boundary of the first pixel region according to a first sampling stride of the first pixel region; and determine the pixel difference among the plurality of first pixel points according to the pixel values of the plurality of first pixel points.

the second pixel region whose pixel difference is greater than that of the first pixel region and that has the same quantity of pixel points as that of the first pixel region is obtaining based on the first pixel region including the target feature point, so that calculation may be performed based on the plurality of second pixel points in the original pixel point quantity, so as to obtain the motion information of the target feature point. Because the pixel difference among the pixel points participating in calculation is increased without changing the quantity of pixel points, the calculation complexity and the information richness extent are balanced, and efficiency of determining the motion information of the target feature point is improved while ensuring accuracy of the motion information of the target feature point.

Figure 9:
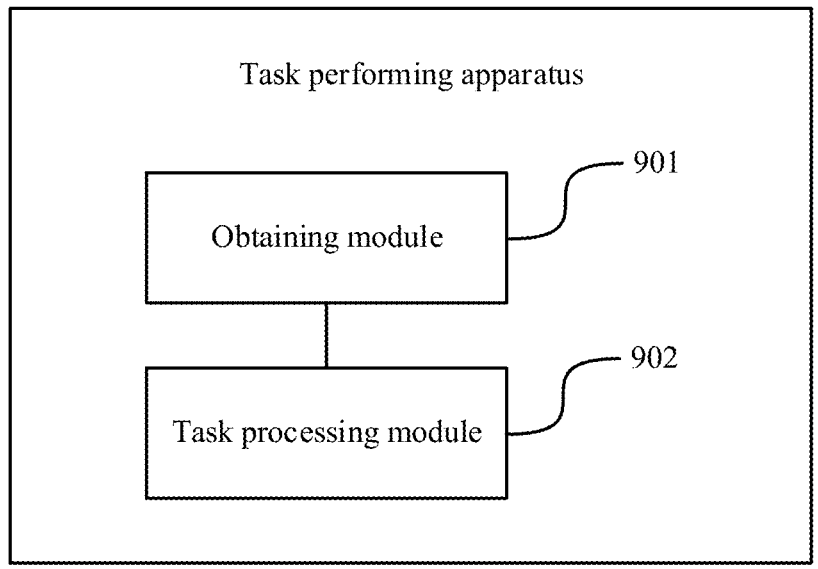
FIG. 9 is a schematic structural diagram of a task performing apparatus according to one or more embodiments of the present disclosure.

FIG. 9 is a schematic structural diagram of a task performing apparatus according to an embodiment of the present disclosure. Referring to FIG. 9, the apparatus includes: an obtaining module 901, configured to obtain a first image and a second image of a target device, the first image and the second image including the same object; and the obtaining module 901 being further configured to obtain motion information of a target feature point on the object in the first image, the motion information being used for indicating changes in locations of the target feature point in the first image and the second image; and a task processing module 902, configured to perform a target task based on the motion information of the target feature point.

In some embodiments, the target task includes a path planning task, and the task processing module 902 is further configured to: determine, when or in response to determining there are a plurality of target feature points and based on motion information of the plurality of target feature points, at least one scene object whose distance to the target device does not exceed a first threshold; and determine, according to a location of a destination whose distance to the target device does not exceed a second threshold and the at least one scene object, a first target path through which the target device reaches the destination, where the second threshold is greater than the first threshold.

In some embodiments, the target task includes an object recognition task, and the task processing module 902 is further configured to: determine, when or in response to determining there are a plurality of target feature points and based on motion information of the plurality of target feature points, a plurality of first feature points, of the plurality of target feature points, whose motion information meets a target condition, where the plurality of first feature points are used for indicating a moving object of a plurality of objects included in the first image and the second image; and determine an object category of the moving object based on locations of the plurality of first feature points in the first image or the second image.

In this embodiment of the present disclosure, the target device may perform the target task by using the motion information of the target feature point on the object in the first image, for example, path planning, motion detection, or recognition of an object category of an object, and the process of determining the motion information of the target feature point is accurate and efficient, thereby improving accuracy and efficiency of performing the target task.

Any combination of the foregoing optional technical solutions may be used to form an optional embodiment of the present disclosure. Details are not described herein again.

When the apparatus for determining motion information of an image feature point provided in the foregoing embodiments determines motion information of a feature point and the task performing apparatus provided in the foregoing embodiments performs a task, the division of the foregoing functional modules is merely used as an example for description. In practice, the foregoing functions may be assigned to and performed by different functional modules as required. That is, an internal structure of the computing device may be divided into different functional modules to perform all or some of the functions described above. In addition, the apparatus for determining motion information of an image feature point provided in the foregoing embodiments belongs to the same idea as the method for determining motion information of an image feature point, and the task performing apparatus provided in the foregoing embodiments belongs to the same idea as the task performing method. For a specific implementation process, refer to the method embodiment. Details are not described herein again.

In some embodiments, a computing device is further provided, including a memory and a processor, the memory storing computer-readable instructions, the computer-readable instructions, when executed by the processor, implementing steps in the foregoing embodiment of the method for determining motion information of an image feature point.

In some embodiments, a target device is further provided, including a memory and a processor, the memory storing computer-readable instructions, the computer-readable instructions, when executed by the processor, implementing steps in the foregoing embodiment of the task performing method.

In some embodiments, a computer-readable storage medium is further provided, storing computer-readable instructions, the computer-readable instructions, when executed by a processor, implementing steps in the foregoing embodiment of the method for determining motion information of an image feature point or steps in the foregoing embodiment of the task performing method.

Figure 10:
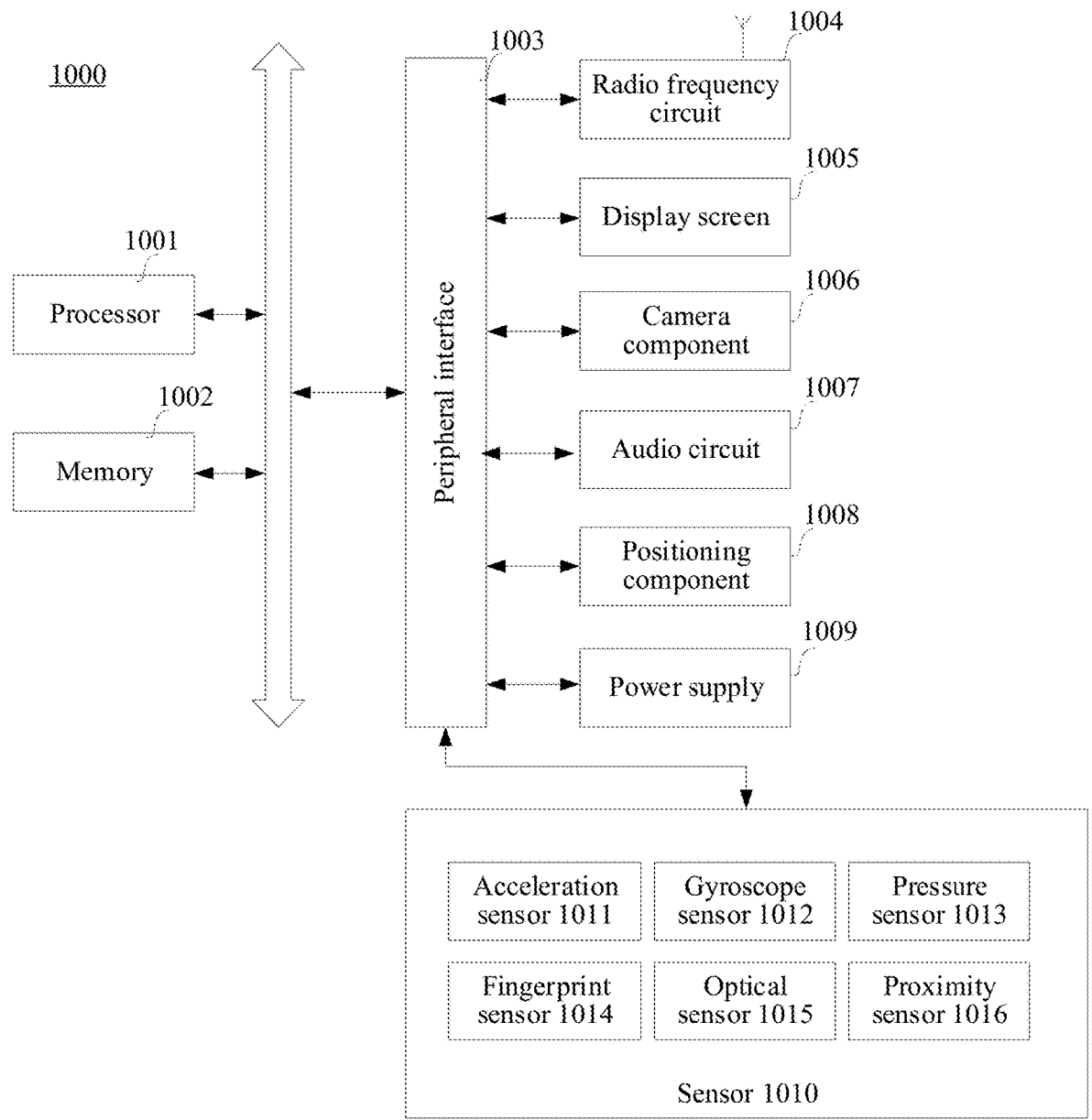
FIG. 10 is a schematic structural diagram of a terminal according to one or more embodiments of the present disclosure.

FIG. 10 is a schematic structural diagram of a terminal according to an embodiment of the present disclosure. The terminal 1000 may be a smartphone, a tablet computer, a Moving Picture Experts Group Audio Layer III (MP3) player, a Moving Picture Experts Group Audio Layer IV (MP4) player, a notebook computer, or a desktop computer. The terminal 1000 may alternatively be referred to as another name such as user equipment, a portable terminal, a laptop terminal, a desktop terminal or the like.

Generally, the terminal 1000 includes a processor 1001 and a memory 1002.

The processor 1001 may include one or more processing cores, and may be, for example, a 4-core processor or an 8-core processor. The processor 1001 may be implemented in at least one hardware form of a digital signal processor (DSP), a field-programmable gate array (FPGA), and a programmable logic array (PLA). The processor 1001 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 1001 may be integrated with a graphics processing unit (GPU). The GPU is configured to render and draw content that may need to be displayed on a display screen. In some embodiments, the processor 1001 may further include an artificial intelligence (AI) processor. The AI processor is configured to process a computing operation related to machine learning.

The memory 1002 may include one or more computer-readable storage media. The computer-readable storage medium may be non-transient. The memory 1002 may further include a high-speed random access memory and a non-volatile memory such as one or more magnetic disk storage devices and a flash storage device. In some embodiments, the non-transitory computer-readable storage medium in the memory 1002 is configured to store at least one instruction, and the at least one instruction is configured to be executed by the processor 1001 to implement the method for determining motion information of an image feature point or the task performing method provided in the method embodiments of the present disclosure.

In some embodiments, the terminal 1000 may include: a peripheral interface 1003 and at least one peripheral. The processor 1001, the memory 1002, and the peripheral interface 1003 may be connected by using a bus or a signal cable. Each peripheral may be connected to the peripheral interface 1003 by using a bus, a signal cable, or a circuit board. Specifically, the peripheral includes: at least one of a radio frequency (RF) circuit 1004, a touch display screen 1005, a camera 1006, an audio circuit 1007, a positioning component 1008, and a power supply 1009.

The peripheral interface 1003 may be configured to connect the at least one peripheral related to input/output (I/O) to the processor 1001 and the memory 1002. In some embodiments, the processor 1001, the memory 1002, and the peripheral interface 1003 are integrated on the same chip or the same circuit board. In some other embodiments, any one or two of the processor 1001, the memory 1002, and the peripheral interface 1003 may be implemented on an independent chip or circuit board, which is not limited in this embodiment.

The radio frequency circuit 1004 is configured to receive and transmit a radio frequency (RF) signal, which is also referred to as an electromagnetic signal. The radio frequency circuit 1004 communicates with a communication network and another communication device by using the electromagnetic signal. The RF circuit 1004 converts an electrical signal into an electromagnetic signal for transmission, or converts a received electromagnetic signal into an electrical signal. In certain embodiments, the RF circuit 1004 includes: an antenna system, an RF transceiver, one or more amplifiers, a tuner, an oscillator, a digital signal processor, a codec chip set, a subscriber identity module card, and the like. The RF circuit 1004 may communicate with another terminal by using at least one wireless communication protocol. The wireless communication protocol includes, but is not limited to, a metropolitan area network, different generations of mobile communication networks (2G, 3G, 4G, and 5G), a wireless local area network, and/or a wireless fidelity (Wi-Fi) network. In some embodiments, the RF circuit 1004 may further include a circuit related to near field communication (NFC), which is not limited in the present disclosure.

The display screen 1005 is configured to display a user interface (UI). The UI may include a graph, text, an icon, a video, and any combination thereof. When the display screen 1005 is a touch display screen, the display screen 1005 is further capable of obtaining, through screening, touch signals on or above a surface of the display screen 1005. The touch signal may be used as a control signal to be inputted into the processor 1001 for processing. In this case, the display screen 1005 may be further configured to provide a virtual button and/or a virtual keyboard that are/is also referred to as a soft button and/or a soft keyboard. In some embodiments, there may be one display screen 1005 disposed on a front panel of the terminal 1000. In some other embodiments, there may be at least two display screens 1005, disposed on different surfaces of the terminal 1000 respectively or in a folded design. In still other embodiments, the display screen 1005 may be a flexible display screen, disposed on a curved surface or a folded surface of the terminal 1000. Even, the display screen 1005 may be further set in a non-rectangular irregular pattern, namely, a special-shaped screen. The display screen 1005 may be prepared by using materials such as a liquid crystal display (LCD), an organic light-emitting diode (OLED), or the like.

The camera component 1006 is configured to obtain images or videos through screening. In certain embodiments, the camera component 1006 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to achieve a background blur function through fusion of the main camera and the depth-of-field camera, a function of panoramic photographing and virtual reality (VR) photographing through fusion of the main camera and the wide-angle camera, or other fusion photographing functions. In some embodiments, the camera component 1006 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1007 may include a microphone and a speaker. The microphone is configured to obtain, through screening, sound waves of a user and an environment, and convert the sound waves into an electrical signal to input to the processor 1001 for processing, or input to the radio frequency circuit 1004 for implementing voice communication. For the purpose of stereo screening or noise reduction, there may be a plurality of microphones, respectively disposed at different portions of the terminal 1000. The microphone may be further a microphone array or an omnidirectional screening microphone. The speaker is configured to convert electrical signals from the processor 1001 or the RF circuit 1004 into sound waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1007 may also include an earphone jack.

The positioning component 1008 is configured to determine a current geographic location of the terminal 1000, to implement a navigation or a location based service (LBS). The positioning component 1008 may be a positioning component based on the Global Positioning System (GPS) of the United States, the BeiDou system of China, the GLONASS System of Russia, or the GALILEO System of the European Union.

The power supply 1009 is configured to supply power to components in the terminal 1000. The power supply 1009 may be an alternating current, a direct current, a primary battery, or a rechargeable battery. When the power supply 1009 includes a rechargeable battery, the rechargeable battery may be a wired rechargeable battery or a wireless rechargeable battery. The rechargeable battery may be further configured to support a fast charging technology.

In some embodiments, the terminal 1000 further includes one or more sensors 1010. The one or more sensors 1010 include, but are not limited to: an acceleration sensor 1011, a gyroscope sensor 1012, a pressure sensor 1013, a fingerprint sensor 1014, an optical sensor 1015, and a proximity sensor 1016.

The acceleration sensor 1011 may detect a magnitude of acceleration on three coordinate axes of a coordinate system established with the terminal 1000. For example, the acceleration sensor 1011 may be configured to detect components of gravity acceleration on the three coordinate axes. The processor 1001 may control, according to a gravity acceleration signal obtained by the acceleration sensor 1011 through screening, the touch display screen 1005 to display the user interface in a transverse view or a longitudinal view. The acceleration sensor 1011 may be further configured to obtain data of a game or a user movement through screening.

The gyroscope sensor 1012 may detect a body direction and a rotation angle of the terminal 1000, and may obtain, through screening, a 3D action of the user on the terminal 1000 together with the acceleration sensor 1011. The processor 1001 may implement the following functions according to the data obtained by the gyroscope sensor 1012 through screening: motion sensing (for example, changing the UI according to a tilt operation of the user), image stabilization during shooting, game control, and inertial navigation.

The pressure sensor 1013 may be disposed at a side frame of the terminal 1000 and/or a lower layer of the touch display screen 1005. When the pressure sensor 1013 is disposed at the side frame of the terminal 1000, a holding signal of the user on the terminal 1000 may be detected. The processor 1001 performs left and right hand recognition or a quick operation according to the holding signal obtained by the pressure sensor 1013 through screening. When the pressure sensor 1013 is disposed at the lower layer of the touch display screen 1005, the processor 1001 controls an operable control on the UI interface according to a pressure operation performed by the user on the touch display screen 1005. The operable control includes at least one of a button control, a scroll-bar control, an icon control, and a menu control.

The fingerprint sensor 1014 is configured to obtain a user's fingerprint through screening, and the processor 1001 identifies a user's identity according to the fingerprint obtained by the fingerprint sensor 1014 through screening, or the fingerprint sensor 1014 identifies a user's identity according to the fingerprint obtained through screening. When identifying that the user's identity is a trusted identity, the processor 1001 authorizes the user to perform related sensitive operations. The sensitive operations include: unlocking a screen, viewing encrypted information, downloading software, paying, changing a setting, and the like. The fingerprint sensor 1014 may be disposed on a front surface, a back surface, or a side surface of the terminal 1000. When a physical button or a vendor logo is disposed on the terminal 1000, the fingerprint 1014 may be integrated with the physical button or the vendor logo.

The optical sensor 1015 is configured to obtain ambient light intensity through screening. In an embodiment, the processor 1001 may control the display brightness of the touch display screen 1005 according to the ambient light intensity obtained by the optical sensor 1015 through screening. Specifically, when the ambient light intensity is relatively high, the display luminance of the touch display screen 1005 is increased. When the ambient light intensity is relatively low, the display luminance of the touch display screen 1005 is reduced. In another embodiment, the processor 1001 may further dynamically adjust a camera parameter of the camera component 1006 according to the ambient light intensity obtained by the optical sensor 1015 through screening.

The proximity sensor 1016, also referred to as a distance sensor, is usually disposed on the front panel of the terminal 1000. The proximity sensor 1016 is configured to obtain a distance between the user and the front face of the terminal 1000 through screening. In an embodiment, when the proximity sensor 1016 detects that the distance between the user and the front surface of the terminal 1000 gradually becomes smaller, the display screen 1005 is controlled by the processor 1001 to switch from a screen-on state to a screen-off state. When or in response to determining the proximity sensor 1016 detects that the distance between the user and the front surface of the terminal 1000 gradually becomes larger, the display screen 1005 is controlled by the processor 1001 to switch from the screen-off state to the screen-on state.

A person skilled in the art may understand that a structure shown in FIG. 10 constitutes no limitation on the terminal 1000, and the terminal may include more or fewer components than those shown in the figure, or some components may be combined, or a different component deployment may be used.

Figure 11:
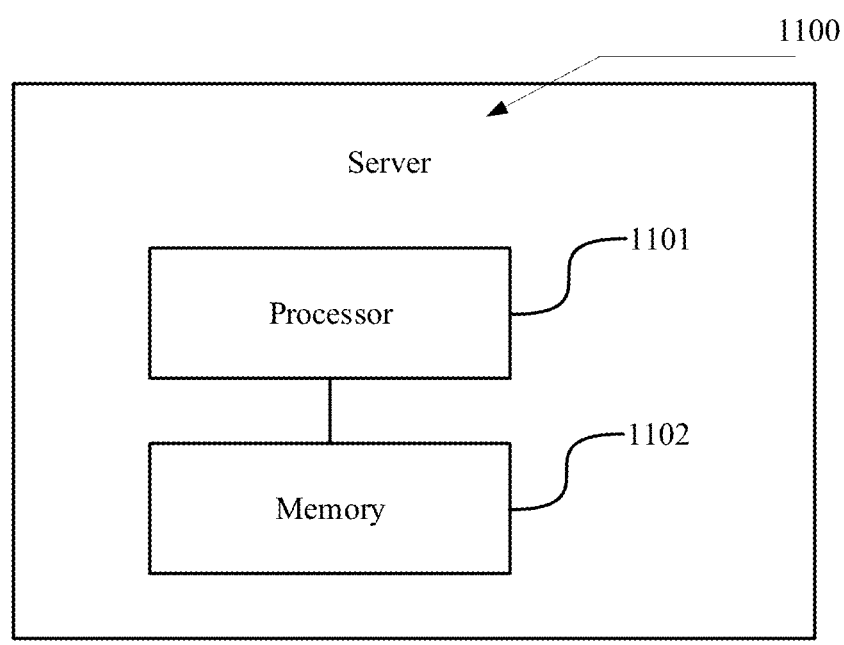
FIG. 11 is a schematic structural diagram of a server according to one or more embodiments of the present disclosure.

FIG. 11 is a schematic structural diagram of a server according to an embodiment of the present disclosure. The server 1100 may vary greatly due to different configurations or performance, and may include one or more processors (CPUs) 1101 and one or more memories 1102. The memory 1102 stores at least one computer-readable instruction, the at least one computer-readable instruction being loaded and executed by the processor 1101 to implement the method for determining motion information of an image feature point or the task performing method provided in the foregoing method embodiments. In certain embodiments, the server may further have a wired or wireless network interface, a keyboard, an I/O interface and other components to facilitate I/O. The server may further include other components for implementing device functions. Details are not described herein again.

In an exemplary embodiment, a computer-readable storage medium, for example, a memory including instructions, is further provided. The instructions may be executed by the processor in the terminal to implement the method for determining motion information of an image feature point or the task performing method in the foregoing embodiments. For example, the computer-readable storage medium may be a read-only memory (ROM), a random access memory (RAM), a compact disc read-only memory (CD-ROM), a magnetic tape, a floppy disk, an optical data storage device, or the like.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely exemplary embodiments of the present disclosure, but are not intended to limit the present disclosure. Any modification, equivalent replacement, or improvement and the like made within the spirit and principle of the present disclosure fall within the protection scope of the present disclosure.

What is claimed is:

1. A method for determining motion information, performed by a computing device, the method comprising:
    obtaining a first image of an object and a second image of the object, the first image having a time stamp earlier than that of the second image;
    determining, based on a target feature point on the object in the first image, a first pixel region including the target feature point in the first image;
    determining a second pixel region including the target feature point in the first image according to a pixel difference among a plurality of first pixel points in the first pixel region and further according to the target feature point, a pixel difference among a plurality of second pixel points in the second pixel region being greater than the pixel difference among the plurality of first pixel points, the plurality of second pixel points and the plurality of first pixel points being same in quantity, and the pixel difference being a pixel variance of a plurality of pixel points or a minimum feature value of a gradient matrix of the plurality of pixel points; and
    obtaining motion information of the target feature point according to the plurality of second pixel points and the second image, the motion information being used for indicating changes in locations of the target feature point in the first image and the second image.

2. The method according to claim 1, wherein determining the second pixel region including the target feature point in the first image comprises:
    obtaining, in response to determining the pixel difference among the plurality of first pixel points in the first pixel region is less than a target difference value, the second pixel region that is greater than the first pixel region and that includes the target feature point according to the target feature point.

3. The method according to claim 1, wherein determining the second pixel region including the target feature point in the first image comprises:
    obtaining, in response to determining the pixel difference among the plurality of first pixel points in the first pixel region is less than a target difference value, the second pixel region in the same size as that of the first pixel region according to the target feature point, wherein the first pixel region and the second pixel region include different pixel points.

4. The method according to claim 2, wherein obtaining the second pixel region according to the target feature point comprises:
    expanding the first pixel region into the second pixel region including the target feature point according to a target expansion coefficient by centering on the target feature point.

5. The method according to claim 3, wherein obtaining the second pixel region in the same size as that of the first pixel region according to the target feature point comprises:
    moving the first pixel region to the second pixel region including the target feature point according to the target feature point and a target movement track.

6. The method according to claim 1, wherein determining the second pixel region including the target feature point in the first image comprises:
    obtaining a third pixel region comprising the target feature point according to the target feature point in response to determining the pixel difference among the plurality of first pixel points is less than a target difference value, wherein a plurality of third pixel points in the third pixel region and the plurality of first pixel points being same in quantity;

determining a pixel difference among the plurality of third pixel points according to pixel values of the plurality of third pixel points in the third pixel region; and determining the third pixel region as the second pixel region in response to determining the pixel difference among the plurality of third pixel points is not less than the target difference value.

7. The method according to claim 6, wherein prior to determining the pixel difference among the plurality of third pixel points, the method further comprises:

increasing a first sampling stride of the first pixel region to a second sampling stride according to an expansion coefficient from the first pixel region to the third pixel region, and obtaining, from the third pixel region according to the second sampling stride, the third pixel points having the same quantity as that of the plurality of first pixel points.

8. The method according to claim 6, wherein prior to determining the pixel difference among the plurality of third pixel points, the method further comprises:

obtaining, from the third pixel region according to a first sampling stride of the first pixel region, the third pixel points having the same quantity as that of the plurality of first pixel points.

9. The method according to claim 6, wherein after determining the pixel difference among the plurality of third pixel points, the method further comprises:

detecting, in response to determining the pixel difference among the plurality of third pixel points is less than the target difference value, whether a size of the third pixel region is greater than a target threshold;

determining a fourth pixel region greater than the third pixel region in response to determining the size of the third pixel region is not greater than the target threshold; and determining the second pixel region comprising the target feature point in the first image based on a pixel difference among a plurality of fourth pixel points in the fourth pixel region and the target feature point, wherein the plurality of fourth pixel points and the plurality of first pixel points have the same quantity.

10. The method according to claim 1, wherein the pixel variance is used for representing a change extent of pixel values of the plurality of pixel points relative to a pixel average value, and the gradient matrix is used for representing a change extent of the pixel values of the plurality of pixel points relative to the pixel average value on a horizontal gradient and a change extent of the pixel values of the plurality of pixel points relative to the pixel average value on a vertical gradient respectively.

11. The method according to claim 1, wherein the first pixel region and the second pixel region are in any shape of a square, a rectangle, a circle, a ring shape, an irregular polygon, or an irregular curved shape.

12. The method according to claim 1, wherein after determining the first pixel region including the target feature point in the first image, the method further comprises:

obtaining the plurality of first pixel points from a plurality of pixel points on a region boundary of the first pixel region according to a first sampling stride of the first pixel region; and determining the pixel difference among the plurality of first pixel points according to the pixel values of the plurality of first pixel points.

13. A computing device, comprising: a memory storing computer program instructions; and a processor coupled to the memory and configured to execute the computer program instructions and perform:

obtaining a first image of an object and a second image of the object, the first image having a time stamp earlier than that of the second image;

determining, based on a target feature point on the object in the first image, a first pixel region including the target feature point in the first image;

determining a second pixel region including the target feature point in the first image according to a pixel difference among a plurality of first pixel points in the first pixel region and further according to the target feature point, a pixel difference among a plurality of second pixel points in the second pixel region being greater than the pixel difference among the plurality of first pixel points, the plurality of second pixel points and the plurality of first pixel points being same in quantity, and the pixel difference being a pixel variance of a plurality of pixel points or a minimum feature value of a gradient matrix of the plurality of pixel points used for indicating a change extent of pixel values of a plurality of pixel pointe; and obtaining motion information of the target feature point according to the plurality of second pixel points and the second image, the motion information being used for indicating changes in locations of the target feature point in the first image and the second image.

14. The computing device according to claim 13, wherein the processor is further configured to execute the computer program instructions and perform:

obtaining, in response to determining the pixel difference among the plurality of first pixel points in the first pixel region is less than a target difference value, the second pixel region that is greater than the first pixel region and that includes the target feature point according to the target feature point.

15. The computing device according to claim 13, wherein the processor is further configured to execute the computer program instructions and perform:

obtaining, in response to determining the pixel difference among the plurality of first pixel points in the first pixel region is less than a target difference value, the second pixel region in the same size as that of the first pixel region according to the target feature point, wherein the first pixel region and the second pixel region include different pixel points.

16. The computing device according to claim 14, wherein the processor is further configured to execute the computer program instructions and perform:

expanding the first pixel region into the second pixel region including the target feature point according to a target expansion coefficient by centering on the target feature point.

17. The computing device according to claim 15, wherein the processor is further configured to execute the computer program instructions and perform:

moving the first pixel region to the second pixel region including the target feature point according to the target feature point and a target movement track.

18. The computing device according to claim 13, wherein the processor is further configured to execute the computer program instructions and perform:

obtaining a third pixel region comprising the target feature point according to the target feature point in response to determining the pixel difference among the plurality of first pixel points is less than a target difference value, wherein a plurality of third pixel points in the third pixel region and the plurality of first pixel points being same in quantity;

determining a pixel difference among the plurality of third pixel points according to pixel values of the plurality of third pixel points in the third pixel region; and determining the third pixel region as the second pixel region in response to determining the pixel difference among the plurality of third pixel points is not less than the target difference value.

19. The computing device according to claim 18, wherein the processor is further configured to execute the computer program instructions and perform:

increasing a first sampling stride of the first pixel region to a second sampling stride according to an expansion coefficient from the first pixel region to the third pixel region, and obtaining, from the third pixel region according to the second sampling stride, the third pixel points having the same quantity as that of the plurality of first pixel points.

20. A non-transitory computer-readable storage medium storing computer program instructions executable by at least one processor to perform:

obtaining a first image of an object and a second image of the object, the first image having a time stamp earlier than that of the second image;

determining, based on a target feature point on the object in the first image, a first pixel region including the target feature point in the first image;

determining a second pixel region including the target feature point in the first image according to a pixel difference among a plurality of first pixel points in the first pixel region and further according to the target feature point, a pixel difference among a plurality of second pixel points in the second pixel region being greater than the pixel difference among the plurality of first pixel points, the plurality of second pixel points and the plurality of first pixel points being same in quantity, and the pixel difference being a pixel variance of a plurality of pixel points or a minimum feature value of a gradient matrix of the plurality of pixel points; and obtaining motion information of the target feature point according to the plurality of second pixel points and the second image, the motion information being used for indicating changes in locations of the target feature point in the first image and the second image.

* * * * *